United States Patent Office 3,830,811
Patented Aug. 20, 1974

3,830,811
2,6-BIS-ALLYLAMINOPYRIMIDINYL
PIPERAZINES
Gilbert Regnier, Ave. due Plessis, Chatenay Malabry, France; Roger Canevari, 12 Rue Chevreuse, Villebon-sur-Yvette, France; and Michel Laubie, 18 Bd Jardy, Vaucresson, France
No Drawing. Filed Feb. 29, 1972, Ser. No. 230,510
Claims priority, application Great Britain, Mar. 15, 1971, 6,886/71
Int. Cl. C07d 51/42
U.S. Cl. 260—256.4 N                 4 Claims

ABSTRACT OF THE DISCLOSURE

Pyrimidinyl piperazines of the formula:

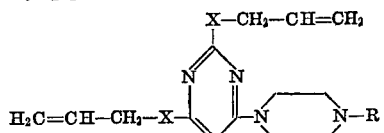

wherein X is oxygen or imino, and R is (a)

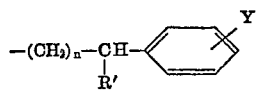

in which $n$ is 0, 1, 2 or 3, R' is hydrogen, phenyl, halophenyl, lower alkylphenyl, lower alkoxyphenyl or methylenedioxyphenyl, and Y is hydrogen, halogen, lower alkyl, lower alkoxy or methylenedioxy, or (b)

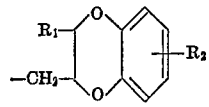

in which $R_1$ is hydrogen or methyl, and $R_2$ is hydrogen, halogen, lower alkyl, lower alkoxy, hydroxy, nitro or amino.

These compounds posses respiratory analeptic properties.

---

The present invention provides a pyrimidinyl piperazine of the general formula I:

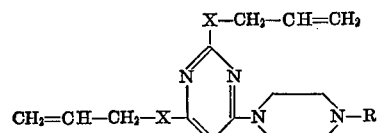

and an acid addition salt thereof, in which X is selected from the group consisting of an oxygen atom and an imino radical; and R is selected from the group consisting of:

(a) A radical of the general formula

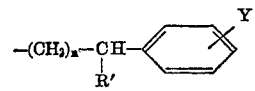

in which $n$ is selected from 0 and an integer of from 1 to 3, R' is selected from the group consisting of: a hydrogen atom, a phenyl radical, a halophenyl radical, for example a chlorophenyl radical and a fluorophenyl radical, a lower alkylphenyl and a lower alkoxyphenyl radical wherein the alkyl and alkoxy moieties have from 1 to 5 carbon atoms, and a methylenedioxyphenyl radical, and Y is selected from the group consisting of a hydrogen atom, a halogen atom, for example, a chlorine atom and a fluorine atom, a lower alkyl and a lower alkoxy radical each containing from 1 to 5 carbon atoms and a methylenedioxy radical; and (b) A radical of the general formula

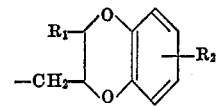

in which $R_1$ is selected from the group consisting of a hydrogen atom and a methyl radical, and $R_2$ is selected from the group consisting of a hydrogen atom, a halogen atom for example a chlorine atom and a fluorine atom, a lower alkyl and a lower alkoxy radical each containing from 1 to 5 carbon atoms, a hydroxy, nitro and amino radical.

A compound of the general formula I wherein R has the meaning (b) and $R_1$ represents a methyl radical, may exist in either the cis or trans form both of which are included in the present invention.

The compounds of the general formula I are new and may be prepared according to a process which comprises condensing a chloropyrimidine of the general formula II:

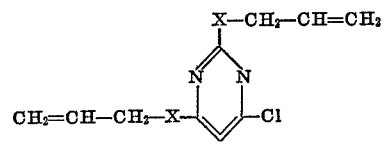

wherein X has the meanings given above, with an N-monosubstituted piperazine of the general formula III

wherein R has the meanings given above.

The condensation may be carried out in a polar solvent, preferably a tertiary aliphatic amide, for example, dimethylformamide or dimethylacetamide. It is advantageous to carry out the reaction at a temperature within the range of from 120° C. to 150° C. in the presence of an acceptor for the hydrochloric acid formed during the reaction. This acceptor may be, for example, an alkali metal or alkaline earth metal salt of carbonic acid, for example, sodium or potassium bicarbonate or carbonate or calcium carbonate, a tertiary organic base, for example, dimethylaniline, pyridine or triethylamine, or an excess of the N-monosubstituted piperazine of the formula III.

The compounds of the general formula I may also be prepared according to a process which comprises condensing a piperazinyl pyrimidine of the general formula IV:

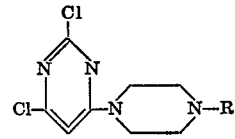

wherein R has the meanings given above with a propene derivative of the general formula V:

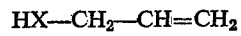

$$HX-CH_2-CH=CH_2 \qquad V$$

wherein X has the meanings given above.

The latter condensation is generally carried out in an autoclave at a temperature within the range of from 120 to 140° C. Furthermore, in the case where the compound of the formula V is allylamine (X=NH), the condensation is advantageously carried out in an excess of allylamine which acts both as a solvent and as an acceptor for the hydrochloric acid formed during the reaction. When the compound of the formula V is allyl alcohol (X=O) the condensation is preferably carried out in an excess of a stoichiometric amount of its sodium salt which may be extemporaneously prepared and used as an acceptor for the hydrochloric acid formed during the reaction.

The compounds of the formula I are weak bases which may be converted into acid addition salts. The acid addition salts may be obtained by reacting compounds of the formula I with acids in suitable solvents, for example water or water-miscible alcohols. As acids suitable for the formation of these salts, there may be mentioned for example, in the mineral series, hydrochloric, hydrobromic, sulphuric and phopshoric acids, and in the organic series, acetic, propionic, maleic, fumaric, tartaric, citric, oxalic, benzoic, methanesulphonic methanedisulphonic and isethionic acids.

The compounds of general formula I may be purified by physical methods, for example, crystallization or chromatography or by chemical methods for example, formation of addition salts with acids and decomposition of these salts with alkaline agents.

The new compounds of general formula I and their physiologically tolerable acid addition salts possess valuable pharmacological and therapeutic properties, which enable them to be used as medicines, especially as respiratory analeptic drugs.

Their acute toxicity was determined in mice by intraperitoneal route and the $LD_{50}$ was found between 50 and 300 mg./kg.

The effect of the new compounds on the respiration was studied in dog, by intravenous administration. It was observed, that 1 mg./kg. of them increases the respiratory volume from 100% to 300%, improviding so considerably the pulmonary ventilation. This activity is long lasting and may reach one hour.

The compounds of the present invention may be used in therapy, especially in the treatment of respiratory insufficiency.

The present invention also provides pharmaceutical compositions containing a compound of the general formula I or a physiologically tolerable salt thereof, together with a suitable pharmaceutical carrier, such as, for example, distilled water, glucose, lactose, talc, starch or cocoa butter. These pharmaceutical compositions may be in the form of tablets, dragees, capsules, suppositories or solutions, in order to be administered by the oral, rectal or parenteral route at the doses of 20 to 200 mg., to 1 to 5 times in a day.

The following Examples illustrate the invention. The melting points were determined in a capillary tube, unless stated otherwise.

EXAMPLE 1

1-(2,6-bis allylamino pyrimidin-4-yl)-4-bis para fluorobenzhydryl piperazine

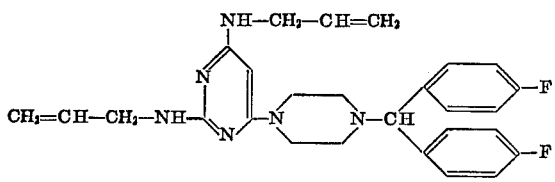

A mixture of 15 g. of 2,6-bis allylamino-4-chloro pyrimidine and 16.5 g. of N-bis para fluorobenzhydryl piperazine (M.P. (Kofler) 88–90° C.) in solution in 300 ml. of dimethylformamide, was heated at 150° C. for 8 hours, in the presence of 19.8 g. of potassium carbonate. On the completion of this operation the salts obtained were filtered off and the solvent was evaporated under vacuum. The oily residue was taken up in 250 ml. of a normal methane sulphonic acid solution. The neutral parts were extracted with ether and the acid solution was rendered alkaline with an excess of potassium carbonate.

The resinous base thus obtained was extracted with ether. After evaporation of this ether, the oily residue (20 g.) was dissolved in 40 ml. of isopropanol. A crystallization was observed, and there were obtained 8 g. of 1-(2,6-bis allylamino pyrimidin-4-yl)-4-bis para fluorobenzhydryl piperazine, melting at 167–168° C.

2,6-bis allylamino-4-chloro pyrimidine, used as starting material (M.P. of its hydrochloride 140–142° C.) was prepared by reacting an excess of allylamine with 2,4,6-trichloropyrimidine in ethanol at 70° C.

EXAMPLES 2–10

The following compounds were prepared according to the method described in Example 1:

(2) 1-(2,6-bis allylamino pyrimidin-4-yl)-4-benzhydryl piperazine, M.P. 157–158° C. (ethanol), starting from 2,6-bis allylamino-4-chloro pyrimidine and N-benzyhydryl piperazine.

(3) 1-(2,6-bis allylamino pyrimidin-4-yl)-4-(3,4-methylene-dioxy benzyl) piperazine, M.P. of its fumarate: 143–145° C. (isopropanol), starting from 2,6-bis allylamino-4-chloro pyrimidine and N-(3,4-methylenedioxy benzyl) piperazine.

(4) 1-(2,6-bis allylamino pyrimidin-4-yl)-4-(benzodioxan-2-yl methyl) piperazine, B.P./0.05 mm. Hg=140–143° C., starting from 2,6-bis allylamino-4-chloro pyrimidine and N-(benzodioxan-2-yl methyl) piperazine.

(5) 1-(2,6-bis allyloxy pyrimidin-4-yl) - 4 - bis para fluorobenzhydryl piperazine, M.P. 69–70° C. (isopropannol), starting from 2,6-bis allyloxy-4-chloro pyrimidine and N-bis para fluorobenzhydryl piperazine.

(6) 1-(2,6-bis allylamino pyrimidin-4-yl) - 4 - para fluorobenzhydryl piperazine, M.P. 161–162° C. (ethanol), starting from 2,6-bis allylamino-4-chloro pyrimidine and N-para fluorobenzhydryl piperazine.

(7) 1-(2,6-bis allylamino pyrimidin-4-yl) - 4 - (7-nitro benzodioxan-2-yl methyl) piperazine, M.P. of its methanesulfonate: 210–215° C. (ethanol), starting from 2,6-bis allylamino-4-chloro pyrimidine and N-(7-nitro benzodioxan-2-yl methyl) piperazine.

(8) 1-(2,6-bis allylamino pyrimidin-4-yl) - 4 - para fluorobenzyl piperazine, starting from 2,6-bis allylamino-4-chloro pyrimidine and N-para fluorobenzyl piperazine.

(9) 1-(2,6-bis allylamino pyrimidin-4-yl) - 4 - bis para chlorobenzhydryl piperazine, starting from 2,6-bis allylamino-4-chloro pyrimidine and N-bis para chlorobenzhydryl piperazine.

(10) 1-(2,6-bis allylamino pyrimidin-4-yl) - 4 - (4,4-bis para fluorophenyl butyl) piperazine, starting from 2,6-bis allylamino-4-chloro pyrimidine and N-(4,4-bis para fluorophenyl butyl) piperazine.

EXAMPLE 11

1-(2,6-bis allylamino pyrimidin-4-yl)-4-bis para fluorobenzhydryl piperazine

A mixture of 3 g. of 1-(2,6-dichloro pyrimidin-4-yl)-4-bis para fluorobenzhydryl piperazine, M.P. (Kofler) 179–181° C., and 50 ml. of allylamine, was heated at 120° C., for 18 hours, in a stainless steel bomb. On the completion of this operation, the solvent was evaporated under vacuum. The crystallizated residue was taken up in 50 ml. of water and filtered. 3 g. of crude product were obtained, and after recrystallization from 70 ml. of isopropanol, there were obtained 2 g. of 1-(2,6-bis allylamino pyrimidin-4-yl)-4-bis para fluorobenzhydryl piperazine, melting at 167–168° C. 1-(2,6-dichloro pyrimidin-4-yl)-4-bis para fluorobenzhydryl piperazine used as starting material was prepared by reacting N-bis para fluorobenzhydryl piperazine with 2,4,6-trichloro pyrimidine in methylethylcetone at −5° C., in the presence of sodium bicarbonate.

EXAMPLES 12-21

The following compounds were prepared according to the method described in Example 11:

(12) 1-(2,6-bis allyloxy pyrimidin-4-yl) - 4 - bis para fluorobenzhydryl piperazine, M.P. 69–70° C. (isopropanol) starting from 1-(2,6-dichloro pyrimidin-4-yl)-4-bis para fluorobenzhydryl piperazine and sodium allyloxide, in an excess of allyl alcohol.

(13) 1-(2,6-bis allylamino pyrimidin-4-yl)-4-(7 - nitro benzodioxan-2-yl methyl) piperazine, M.P. of its methane sulfonate: 210–215° C. (ethanol), starting from 1-(2,6-dichloropyrimidin-4-yl)-4-(7 - nitro benzodioxan - 2 - yl methyl) piperazine and allylamine.

(14) 1-(2,6-bis allylamino pyrimidin - 4 - yl) - 4 - (3-methyl benzodioxan-2-yl methyl) piperazine, starting from 1-(2,6-dichloro pyrimidin-4-yl)-4-(3-methyl benzodioxan-2-yl methyl) piperazine and allylamine.

(15) 1-(2,6-bis allylamino pyrimidin - 4 - yl) - 4 - (7-amino benzodioxan-2-yl methyl) piperazine, M.P. of its trihydrochloride monohydrate: 212–220° C., starting from 1-(2,6-dichloro pyrimidin-4-yl)-4-(7-amino benzodioxan-2-yl methyl) piperazine and allylamine.

(16) 1-(2,6-bis allylamino pyrimidin - 4 - yl) - 4 - (7-hydroxy benzodioxan-2-yl methyl) piperazine, starting from 1-(2,6-dichloro pyrimidin-4-yl)-4-(7-hydroxy benzodioxan-2-yl methyl) piperazine and allylamine.

(17) 1-(2,6-bis allylamino pyrimidin - 4 - yl) - 4 - (7-methoxy benzodioxan-2-yl methyl) piperazine, starting from 1-(2,6-dichloro pyrimidin-4-yl) - 4 - (7 - methoxy benzodioxan-2-yl methyl) piperazine and allylamine.

(18) 1-(2,6-bis allylamino pyrimidin-4 - yl) - 4 - (7-chloro benzodioxan-2-yl methyl)piperazine, starting from 1-(2,6-dichloro pyrimidin-4-yl)-4-(7-chloro benzodioxan-2-yl methyl) piperazine and allylamine.

(19) 1-(2,6-bis allylamino pyrimidin - 4 - yl) - 4 - (7-methyl benzodioxan-2-yl methyl) piperazine, starting from 1-(2,6-dichloro pyrimidin-4-yl)-4-(7-methyl benzodioxan-2-yl methyl) piperazine and allylamine.

(20) 1-(2,6-bis allylamino pyrimidin-4-yl) - 4 - (3,4-methylenedioxy benzyl) piperazine, M.P. of its fumarate: 143–145° C. (isopropanol) starting from 1-(2,6-dichloro pyrimidin-4-yl)-4-(3,4-methylenedioxy benzyl) piperazine and alylamine.

(21) 1-(2,6-bis allylamino pyrimidin-4-yl) - 4 - benzodioxan-2-yl methyl) piperazine, B.P. 0.05 mm. Hg: 140–143° C., starting from 1-(2,6-dichloro pyrimidin-4-yl)-4-(benzodioxan-2-yl methyl) piperazine and allylamine.

We claim:
1. A compound selected from the group consisting of
(A) a compound of the formula

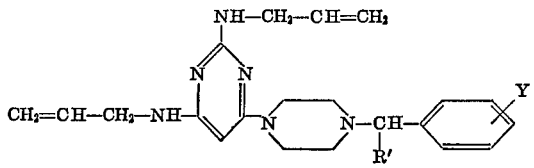

wherein R' is selected from the group consisting of hydrogen, phenyl, chlorophenyl, fluorophenyl, lower alkylphenyl and lower alkoxyphenyl wherein the alkyl and alkoxy moieties have from 1 to 5 carbon atoms inclusive, and methylenedioxyphenyl and Y is selected from the group consisting of hydrogen, chlorine, fluorine, lower alkyl and lower alkoxy each having from 1 to 5 carbon atoms inclusive and methylenedioxy; and
(B) a physiologically tolerable acid addition salt thereof.

2. A compound of claim 1 which is 1-(2,6-bis allylamino pyrimidin-4-yl) - 4 - bis para fluorobenzhydryl piperazine.

3. A compound of claim 1 which is 1-(2,6-bis allylamino pyrimidin-4-yl)-4 - (3,4 - methylenedioxy benzyl) piperazine.

4. A compound of claim 1 which is 1-(2,6-bis allylamino pyrimidin-4-yl)-4 - (benzodioxan - 2 - yl methyl) piperazine.

References Cited

UNITED STATES PATENTS 3,299,067  1/1967  Regnier et al. _____ 260—256.4

FOREIGN PATENTS 1,505,109  10/1967  France _____ 260—256.4 X

OTHER REFERENCES

Regnier et al.: Chemical Abstract, 70:11717k of French Pat. 1,505,109.
Endo et al.: Chemical Abstract, 60:3385h.

DONALD G. DAUS, Primary Examiner
R. D. McCLOUD, Assistant Examiner

U.S. Cl. X.R.

260—251 R, 256.4 C, 268 BC, 268 BZ, 268 R; 424—251